Aug. 28, 1962   A. N. FARRELL   3,051,859
INTERDIGITATED POLE ASSEMBLY
Filed Feb. 18, 1960   2 Sheets-Sheet 1

INVENTOR.
ADAM N. FARRELL, DECEASED,
BY  EVADNA M. FARRELL,
       ADMINISTRATRIX,

BY  Vernon N. Kalb

ATTORNEY

Aug. 28, 1962  A. N. FARRELL  3,051,859
INTERDIGITATED POLE ASSEMBLY
Filed Feb. 18, 1960  2 Sheets-Sheet 2
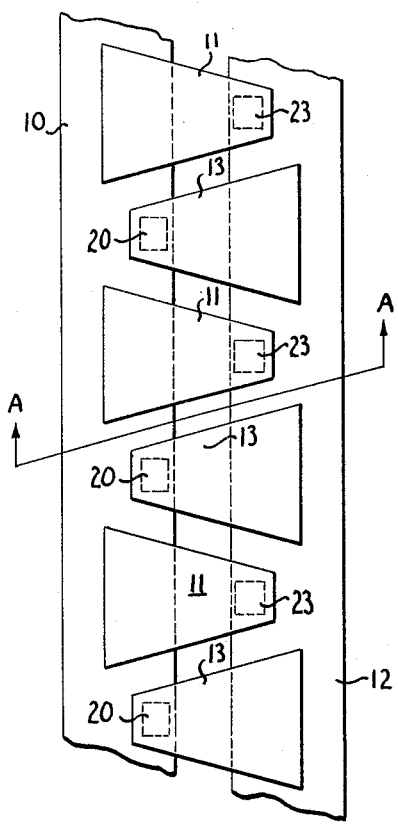
FIG. 3
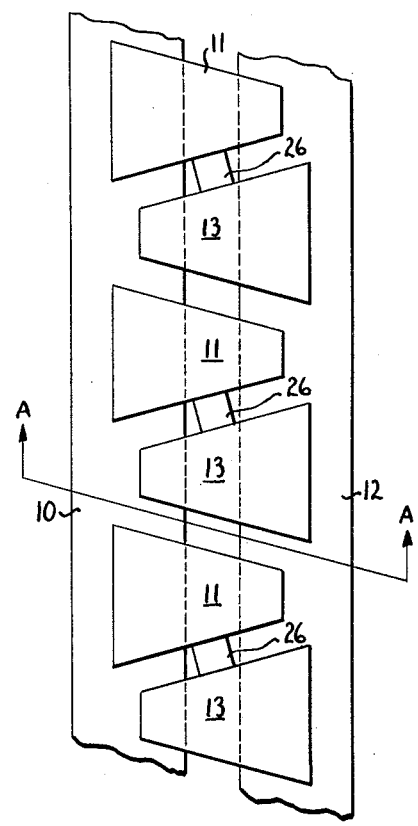
FIG. 4
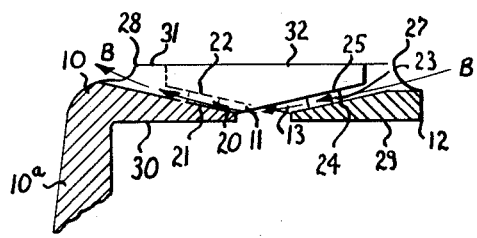
FIG. 3ᵃ
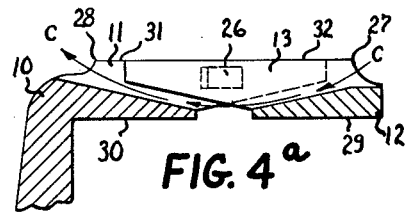
FIG. 4ᵃ
INVENTOR.
ADAM N. FARRELL, DECEASED
BY EVADNA M. FARRELL,
ADMINISTRATRIX,
BY Vernon N. Kalb
ATTORNEY United States Patent Office 3,051,859
Patented Aug. 28, 1962

3,051,859
INTERDIGITATED POLE ASSEMBLY
Adam N. Farrell, deceased, late of Erie, Pa., by Evadna M. Farrell, administratrix, Erie, Pa., assignor to General Electric Company, a corporation of New York
Filed Feb. 18, 1960, Ser. No. 9,534
8 Claims. (Cl. 310—105)

This invention relates to interdigitated pole field assemblies for dynamoelectric machines, and more particularly relates to a new and improved rotating interdigitated pole and field assembly for dynamoelectric machines and a method for making the same.

Although this invention is applicable to any dynamoelectric machine in which a rotating interdigitated pole field assembly is utilized, it is particularly illustrated and described as incorporated in an eddy current coupling such as the one of the type disclosed and claimed in the copending application of Charles M. Wheeler and Philip M. Folger, Serial No. 822,947, filed June 25, 1959.

Briefly stated, an eddy current coupling is an electromagnetic device that may be used to obtain adjustable speed from a constant or variable speed source. Operation is based on the principle that the current induced in a closed conductor loop by a rotating field reacts with the field to produce torque in the direction of rotation. A solid drum is in effect a number of such conductor loops and acts as a magnetic flux carrier as well. When there is relative rotation between such a drum and field member, a torque is developed on the field member which causes rotation thereof. For certain applications the use of an interdigitated pole rotating field assembly in eddy current couplings provides a more efficient design for the production of torque.

Figure 2:
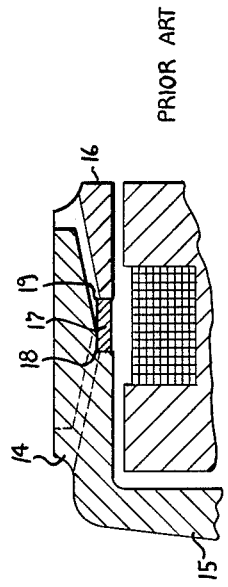

It is customary to form an interdigitated pole field assembly designed for rotation about a stationary field member from two annular members having oppositely directed mating teeth-like poles. One of these members is secured to the output shaft of an eddy current coupling, and the second member is supported by and spaced from the first member. Previously it has been the practice to machine seats through the interdigitated poles and weld an annular ring through the channels thus formed to the interdigitated poles to support the second member on the first member and provide the desired spacing between the interdigitated poles. This support and spacing arrangement requires machining operations of both continuous and interrupted surfaces and requires welding within the machined portions of the spaced members a ring of nonmagnetic material which must also have finished surfaces. "Nonmagnetic" as used in this specification means a material of low magnetic permeability, or, alternatively stated, of high magnetic reluctance. Furthermore, this nonmagnetic ring blocks the flow of air over the surfaces of the stationary field coil. This particular prior art arrangement is illustrated in FIGURE 2.

Another prior art method of supporting and spacing two members which permits some cooling air flow through the interdigitated pole assembly is to utilize a plurality of nonmagnetic bolts to hold the supported member in assembly with the supporting member, and also to clamp a nonmagnetic spacer ring between the field members. It is readily apparent that this construction suffers from the disadvantage of utilizing the continuous nonmagnetic ring, as well as the time and material required to thread the members to receive the securing bolts, together with the necessity for the bolts and the necessity of machining seats for the continuous ring and finishing surfaces of the nonmagnetic ring.

In view of the deficiencies and limitations of these prior art interdigitated field assemblies and methods of assembling, it is a primary object of this invention to provide a new and improved interdigitated pole field assembly and a method of manufacturing such assemblies.

Briefly stated, this and other objects of this invention in one form thereof are accomplished by supporting one member upon the other by means of nonmagnetic spacers welded between pole-forming teeth of the supporting and supported members and to the annular portions of the respective member. In assembling the interdigitated pole field assembly, the nonmagnetic spacers are first welded to the pole-forming teeth of the members, which may be positioned in a fixture or jig. The members are axially aligned and moved into a predetermined spaced relationship and welds are then accomplished between the spacers and the members to bond the members together.

Figure 1:
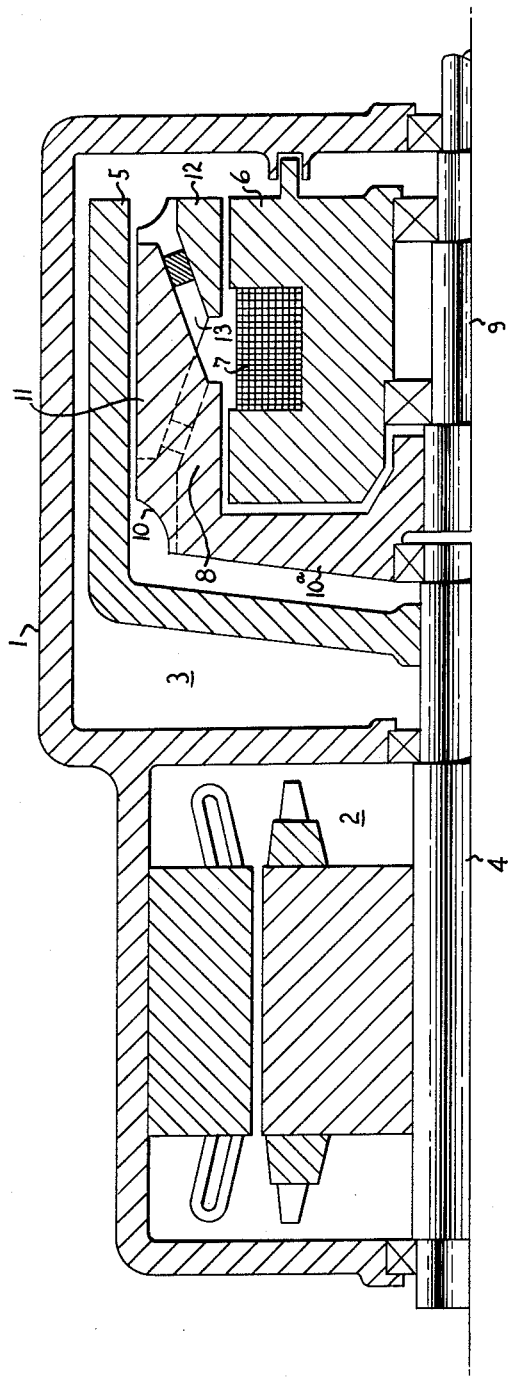

The novel features of the invention are set forth with particularity in the appended claims. The invention itself, however, both as to its organization and operation, together with further objects and advantages thereof, may best be understood when taken in connection with the following drawings, in which like numerals refer to like parts in the several figures depicting the invention, wherein:

FIGURE 1 illustrates an eddy current coupling apparatus incorporating this invention;
FIGURE 2 is exemplary of prior art construction;
FIGURES 3 and 3a illustrate one embodiment of the invention; and
FIGURES 4 and 4a are illustrative of another embodiment of the invention.

Reference is now made to FIG. 1 which, for purposes of illustration and orientation, shows an eddy current coupling apparatus of the type described in the previously referenced copending application. In FIG. 1 a common housing 1 is shown for both a motor 2 and eddy current coupling 3. When the field of the motor 2 is excited, the motor shaft 4 is rotated and eddy current drum 5 mounted on motor shaft 4 rotates therewith. The eddy current coupling generally comprises a nonrotating field 6 having a field coil 7 and an interdigitated pole rotating field assembly 8 which is mounted on output shaft 9. The rotating field assembly comprises an annular hub or supporting member 10 having tooth-like projections which form poles 11 and a hub portion 10a secured to shaft 9 and extending from shaft 9 to the annular portion. A second annular member 12 having tooth-like projections which form poles 13 is supported on and spaced from member 10 by nonmagnetic spacers welded between the two members. Reference may be had to the aforementioned application for details and operation of the particular apparatus illustrated.

Reference is now made to FIG. 2 which illustrates a typical prior art interdigitated pole field assembly used in conjunction with a stationary field coil. This prior art assembly comprises an annular supporting member 14 having a hub portion 15 which is affixed to an output shaft, not shown in FIG. 2, of an eddy current coupling. Supported from the supporting member 14 is an annular supported member 16 which is secured to and spaced from the member 14 by a nonmagnetic spacing ring 17 which is welded to both the supporting member and supported member in machined seats 18 and 19 in the members 14 and 16 respectively. Seats 18 and 19 in members 14 and 16 respectively are machined to provide proper fit of the nonmagnetic spacing member 17 and positive spacing of the members 14 and 16. The spacing member 17 may then be welded to the members 14 and 16 as indicated. This type of construction necessitates the cutting and machining of seats in all of the pole members and machining of the member 17. The machining of the seats 18 and 19 in the pole portions of the members 14 and 16 requires the machining of an interrupted surface which is a delicate machining operation. The annular nonmagnetic spacing ring 17 blocks air flow through the interdigitated poles which would otherwise remove heat from the stationary coil.

Reference is now made to FIGS. 3 and 3a which illustrate portions of an interdigitated pole field assembly incorporating the present invention. FIG. 3 is a developed view of an interdigitated pole field assembly of this invention, and FIG. 3a is a view taken along section A—A of FIG. 3. The construction shown in FIGS. 3 and 3a is the structure shown in FIG. 1. Annular member 10 is secured to shaft 9, FIG. 1, through hub portion 10a. Nonmagnetic spacing members 20 are welded to the underside of the poles 13 of member 12 at surface 22 and to the annular portion of member 10 on surface 21. Similarly, nonmagnetic spacers 23 are welded to the underside of poles 11 at surface 25 and to the surface 24 of member 12. It is readily seen that this construction permits the flow of air through the interdigitated field assembly and over the stationary field coil, as indicated by the arrows B, FIG. 3a.

In constructing the interdigitated pole field assembly of FIGS. 3 and 3a, the members 10 and 12 are formed usually by casting a magnetic ferrous material and the nonmagnetic spacers 20 and 23 are welded to the surfaces 22 and 25 of poles 11 and 13 respectively at a predetermined dimension from the tip of the pole. This dimension may vary with the size of the spacers used and the size of the desired pole assembly, as well as the spacing desired between the members 10 and 12. The members 10 and 12 are then axially aligned and moved into proper spaced relation with each other, the poles 11 and 13 being properly spaced from each other and welds are then accomplished between the spacers 20 and 23 and surfaces 21 and 24 respectively.

The above-enumerated steps of assembly may be accomplished in whole or in part while the members 10 and 12 are positioned in a suitable workholder or jig. In FIG. 3, it is shown that each pole 11 and 13 has affixed thereto a spacing element. It is to be understood that it is not necessary that a spacer be welded between every adjacent pair of poles and an annular member. In practice, it may be sufficient to provide a nonmagnetic spacing member between alternate poles and the corresponding annular member or between two adjacent poles alternately around the assembly, providing a structure where two adjacent poles are bonded through nonmagnetic spacers to the corresponding annular member and the next two adjacent poles are not. The selection of which poles are to be spaced and bonded to the corresponding annular member is a matter of choice and design, which will be dictated, among other things, by the size of the interdigitated pole assembly.

The nonmagnetic spacing elements are preferably cut from a bar of nonmagnetic stock of predetermined dimensions. It is not critical that the spacer be critically dimensioned since any minus dimension may be corrected by weld. It is preferred that the spacers be of stainless steel to enhance the facility of welding the spacers to the members 10 and 12. However, copper, brass or aluminum spacers may be used and bonded to the members 10 and 12 by silver brazing or other suitable means. In the field assembly disclosed, this invention eliminates the necessity for machining the surfaces 21, 22, 24, 25, or the spacers 20 and 23.

In FIGS. 4 and 4a is shown an alternate embodiment of the invention. In this construction nonmagnetic spacers 26 are welded between the sides of the teeth forming the interdigitated poles 11 and 13. In assembly, a nonmagnetic spacing element 26 is welded to one side of selected poles of one of the members 10 or 12, preferably poles 11 on the supporting member 10 at a predetermined distance from the tip of the poles. The supported member 12 is then axially aligned with the supporting member 10 and axially moved into the proper relationship with the nonmagnetic spacing elements 26 and has its poles 13 welded to the spacing elements 26 on the side of the poles. This construction, as that of FIGS. 3 and 3a, presents a very simple method of assembly inasmuch as proper spacing of the interdigitated poles is easily accomplished. For example, the distance between the edges 27 and 28 of members 10 and 12 may be used as a reference to obtain proper axial spacing of members 10 and 12. The construction of FIG. 4, like that of FIG. 3, requires no machining operations for placement or seating of the nonmagnetic spacing elements.

It may readily be seen from an inspection of FIG. 4a that this embodiment of the invention allows air flow over the surface of the stationary coil 7, as depicted by the arrows C, FIG. 4a.

Reference is again made to FIGS. 3 and 3a. As illustrated, the inclined surfaces 22 of poles 13 and the inclined surface 21 of member 10 are substantially parallel where poles 13 overhang member 10. Surfaces 25 of poles 11 and surface 24 of member 12 are also substantially parallel where the poles 11 overhang member 12. As shown in FIG. 4, the adjacent sides of the interdigitating poles 11 and 13 are substantially parallel and therefore the spacers 26 may easily be cut from bar stock of a predetermined size, as may the spacers 11 and 13, FIG. 3.

After the interdigitated pole field assembly has been assembled, the inner surfaces 29 and 30 of members 12 and 10 respectively are machined to insure proper clearance between these surfaces and the stationary field member 6, FIG. 1. The surfaces 29 and 30 are cylindrical and coaxial with the axis of shaft 9. Surfaces 31 and 32 of poles 11 and 13 respectively are machined to insure proper spacing of these surfaces from the inner surface of eddy current drum 5. These surfaces 31 and 32 are parallel to the axis of output shaft 9 also.

The hub portion 10a which is affixed to output shaft 9 may be solid or formed of a plurality of spokes extending to the annular portion. It is further contemplated that the hub portion 10a and the annular portion of member 10 may be formed of distinct members which may be assembled to form a member equivalent to member 10. After assembly, the field assembly 8 is essentially a unitary structure which is arranged to be coaxial with output shaft 9 and be affixed thereon.

While the invention has been particularly illustrated as incorporated in the structure of an interdigitated pole field assembly for an eddy current coupling, it is to be understood that it is equally applicable for an interdigitated pole field assembly wherever one field member is supported from the other, and changes and modifications to the disclosed structure may occur to those skilled in the art without departing from the spirit and scope of this invention. Accordingly, it is intended to cover all changes and modifications of the examples of the invention herein chosen for purposes of disclosure, which do not constitute departures from the spirit and scope of the invention.

What is claimed as new and is desired to be obtained by Letters Patent is:

1. A rotatable interdigitated pole field assembly for a dynamoelectric machine comprising a hub member having an annular portion and pole-forming teeth projecting axially from the annular portion, a second member having an annular portion and pole-forming teeth projecting axially therefrom and interdigitating with the teeth of said hub member, said first and second members being axially aligned, said second member being supported by and spaced from said hub member by means of nonmagnetic spacing members welded to pole-forming teeth of one of said members and to a surface on the other of said members.

2. A rotatable interdigitated pole field assembly for a dynamoelectric machine comprising a hub member having an annular portion and pole-forming teeth projecting axially from the annular portion, a second member having an annular portion and pole-forming teeth projecting axially therefrom and interdigitating with the teeth of said hub member, said first and second members being axially aligned, said second member being supported by and spaced from said hub member by means of nonmagnetic spacing members welded between the underside of the teeth of one of said members and the annular portion of the other of said members.

3. A rotatable interdigitated pole field assembly for a dynamoelectric machine comprising a hub member having an annular portion and pole-forming teeth projecting axially from the annular portion, a second member having an annular portion and pole-forming teeth projecting axially therefrom and interdigitating with the teeth of said hub member, said first and second members being axially aligned, said second member being supported by and spaced from said hub member by means of nonmagnetic spacing members welded between sides of adjacent interdigitating poles.

4. An eddy current coupling output shaft having an interdigitated pole field assembly mounted thereon, said field assembly comprising a first member having a hub portion affixed to the shaft and extending radially therefrom into an annular portion having inner and outer surfaces, said inner surface being substantially cylindrical and coaxial with the shaft, said outer surface being inclined towards the axis of the shaft, pole-forming teeth projecting axially from the inclined surface at spaced intervals about the periphery, said teeth having outer surfaces substantially parallel to the axis of the shaft and inner surfaces inclined away from the axis of the shaft toward the tips of the teeth, a second member having an annular portion with like surfaces to the annular portion of the first member and having axially projecting teeth spaced at intervals around its periphery, the teeth of said second member having like surfaces to the teeth of the first member, the number of teeth on each of said members being equal, the teeth of said members being interdigitated and the second member being supported on and spaced from said first member by means of nonmagnetic spacing elements bonded between the inclined surface of the teeth of one of said members and the inclined surface of the annular portion of the other of said members, said inclined surfaces being substantially parallel.

5. In an eddy current coupling device having a stationary field coil and an eddy current drum arranged to rotate thereabout, said eddy current drum being mounted on a drive shaft, an output shaft aligned with said drive shaft, a rotatable interdigitated pole field assembly interposed between said stationary field and said eddy current drum, said interdigitated pole field assembly comprising a support member having a hub portion affixed to said output shaft and an annular portion coaxial with said output shaft, said annular portion having pole-forming teeth projecting axially from said annular portion, a second annular member coaxial with said output shaft and having axially projecting pole-forming teeth interdigitating with the pole-forming teeth of the first-mentioned member, and nonmagnetic spacing elements bonded between the pole-forming teeth of one of said members and a surface of the other of said members at predetermined positions thereon to support and space said second member from said first member.

6. In an eddy current coupling device having a stationary field coil and an eddy current drum arranged to rotate thereabout, said eddy current drum being mounted on a drive shaft, an output shaft aligned with said drive shaft, a rotatable interdigitated pole field assembly interposed between said stationary field and said eddy current drum, said interdigitated pole field assembly comprising a support member having a hub portion affixed to said output shaft and an annular portion coaxial with said output shaft, said annular portion having pole-forming teeth projecting axially from said annular portion, a second annular member coaxial with said output shaft and having axially projecting pole-forming teeth interdigitating with the poleforming teeth of the first-mentioned member, and nonmagnetic spacing elements bonded between adjacent sides of the interdigitating poles of said members to support and space said second member from said first member.

7. An eddy current coupling output shaft having an interdigitated pole field assembly mounted thereon, said field assembly comprising a first member having a hub portion affixed to the shaft and extending radially therefrom into an annular portion having inner and outer surfaces, pole-forming teeth projecting axially from the outer surface at spaced intervals about the periphery thereof, a second annular member having inner and outer surfaces and having teeth axially projecting from the outer surface spaced at intervals around its periphery, the number of teeth on each of said members being equal, the teeth of each of said members being interdigitated and overhanging the annular portion of the other member, and nonmagnetic spacing elements bonded between selected teeth on at least one of said members and the surface overhung by said selected teeth.

8. An eddy current coupling output shaft having an interdigitated pole field assembly mounted thereon, said field assembly comprising a first member having a hub portion affixed to the shaft and extending radially therefrom into an annular portion having inner and outer surfaces, pole-forming teeth projecting axially from the inclined surface at spaced intervals about the periphery thereof, a second annular member having inner and outer surfaces and having teeth axially projecting from the outer surface spaced at intervals around its periphery, the number of teeth on each of said members being equal, the teeth of said members being interdigitated and having substantially parallel surfaces on adjacent sides, the second member being supported on and spaced from said first member by means of nonmagnetic spacing elements bonded between selected adjacent substantially parallel surfaces of said interdigitating teeth.

References Cited in the file of this patent

FOREIGN PATENTS 1,043,482   Germany _____ Nov. 13, 1958